(12) United States Patent
Wu

(10) Patent No.: US 7,205,747 B2
(45) Date of Patent: Apr. 17, 2007

(54) SYSTEM AND METHOD FOR MONITORING A CHARGING PERIOD IN A BATTERY CHARGER

(75) Inventor: Zengjing Wu, Irvine, CA (US)

(73) Assignee: Intersil Americas, Inc., Milpitas, CA (US)

( * ) Notice: Subject to any disclaimer, the term of this patent is extended or adjusted under 35 U.S.C. 154(b) by 63 days.

(21) Appl. No.: 10/888,062

(22) Filed: Jul. 9, 2004

(65) Prior Publication Data

US 2006/0006843 A1   Jan. 12, 2006

(51) Int. Cl.
*H02J 7/00* (2006.01)
(52) U.S. Cl. .............. 320/114; 320/133; 320/112; 320/155; 320/106; 320/DIG. 12
(58) Field of Classification Search ......... 320/107, 320/112, 114, 124, 130, 133, 155, 160
See application file for complete search history.

(56) References Cited

U.S. PATENT DOCUMENTS

| | | | | |
|---|---|---|---|---|
| 3,723,772 A * | 3/1973 | Collom | .................. | 327/396 |
| 4,260,230 A * | 4/1981 | Suzuki | .................. | 396/301 |
| 4,286,204 A * | 8/1981 | Belot | .................. | 320/133 |
| 4,395,672 A * | 7/1983 | Gassaway | .............. | 320/158 |
| 4,536,697 A * | 8/1985 | Johnston et al. | .......... | 322/14 |
| 4,609,860 A * | 9/1986 | Fasen | .................. | 320/131 |
| 4,667,143 A * | 5/1987 | Cooper et al. | ............ | 320/153 |
| 4,994,728 A * | 2/1991 | Sasaki | ................ | 320/132 |
| 5,113,128 A * | 5/1992 | Ohara et al. | ............ | 320/160 |
| 5,117,173 A * | 5/1992 | Oliva et al. | ............. | 320/160 |
| 5,187,425 A * | 2/1993 | Tanikawa | ............... | 320/138 |
| 5,302,887 A * | 4/1994 | Ishiguro et al. | .......... | 320/106 |
| 5,402,107 A * | 3/1995 | Rencavage | ............ | 340/573.7 |
| 5,454,710 A * | 10/1995 | Landau et al. | ............ | 429/50 |
| 5,508,878 A * | 4/1996 | Pecore | ............... | 361/195 |
| 5,563,495 A * | 10/1996 | Tomiyori et al. | ......... | 320/163 |
| 5,631,537 A * | 5/1997 | Armstrong | ............. | 320/118 |
| 5,729,774 A * | 3/1998 | Constable | ............. | 396/206 |
| 5,841,284 A * | 11/1998 | Takahashi | ............. | 324/428 |
| 5,965,997 A * | 10/1999 | Alwardi et al. | ........... | 320/132 |
| 6,229,284 B1* | 5/2001 | Martin et al. | ............ | 320/130 |
| 6,310,461 B1* | 10/2001 | Romao | ............... | 320/114 |
| 6,522,104 B1* | 2/2003 | Drori | .................. | 320/149 |
| 6,822,425 B2* | 11/2004 | Krieger et al. | .......... | 320/139 |
| 6,930,469 B2* | 8/2005 | Krieger et al. | .......... | 320/160 |

\* cited by examiner

*Primary Examiner*—Karl Easthom
*Assistant Examiner*—Samuel Berhanu
(74) *Attorney, Agent, or Firm*—Howison & Arnott, L.L.P.

(57) ABSTRACT

An apparatus and method for disabling a charging counter circuitry within a battery charger is disclosed. The apparatus includes circuitry connected to a pin associated with the charging counter circuitry of the battery charger, said circuitry receiving a signal from a device connected to the battery charger. The circuitry disables the charging counter circuitry responsive to a signal from the device at a first level and enables the charging counter circuitry responsive to the signal from the device at a second level.

19 Claims, 3 Drawing Sheets

SYSTEM AND METHOD FOR MONITORING A CHARGING PERIOD IN A BATTERY CHARGER

TECHNICAL FIELD OF THE INVENTION

The present invention relates to battery chargers, and more particularly, to a system and method for more accurately tracking the period of time a battery charger is actually charging an associated battery.

BACKGROUND OF THE INVENTION

Battery chargers are devices that enable the charging of many portable hand-held electronic devices, such as cell phones, PDAs, laptop computers, portable e-mail receivers, pagers, etc. When a portable electronic device is placed within the battery charger, the charger will replenish the battery pack associated with the portable electronic device. However, if the portable electronic device placed within the battery charger is in a use mode while within the charger, the charge current being provided by the battery charger, rather than recharging the battery associated with the portable electronic device, instead powers the operations of the portable electronic device.

Many battery chargers additionally include a functionality for monitoring a charge TIME pin 106 for a battery connected to the battery charger. Upon connection of the battery to the battery charger, a charge counter begins counting the length of time the battery is connected. When a preset period of time expires and no indication has been received that a connected battery is fully charged, a fault indication of some type may be provided. The problem with this configuration is that if the charge current from the battery charger is being used to power a use mode of the portable electronic device rather than to charge a battery, the counter is still counting time as if the charge current is being used to charge the battery. Thus, a false fault signal may be generated by the battery charger. Traditionally, individuals have disabled the time out function within the battery charger in order to solve this issue. However, this causes the battery charger to lose its time out protection feature for situations when the time out counter would actually detect a fault condition. Thus, some system and method for enabling an accumulation of actual charging time without falsely registering use time of a connected battery is desired.

SUMMARY OF THE INVENTION

The present invention disclosed and claimed herein, in one aspect thereof, comprises an apparatus and method for disabling charging counter circuitry within a battery charger. Circuitry is connected to a pin associated with the charging counter circuitry of the battery charger and the circuitry receives a signal from a device connected to the battery charger. The circuitry, responsive to a signal from the device at a first level, disables the charging counter circuitry. Responsive to a signal from the device at a second level, the circuitry will enable the charging counter circuitry of the battery charger.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
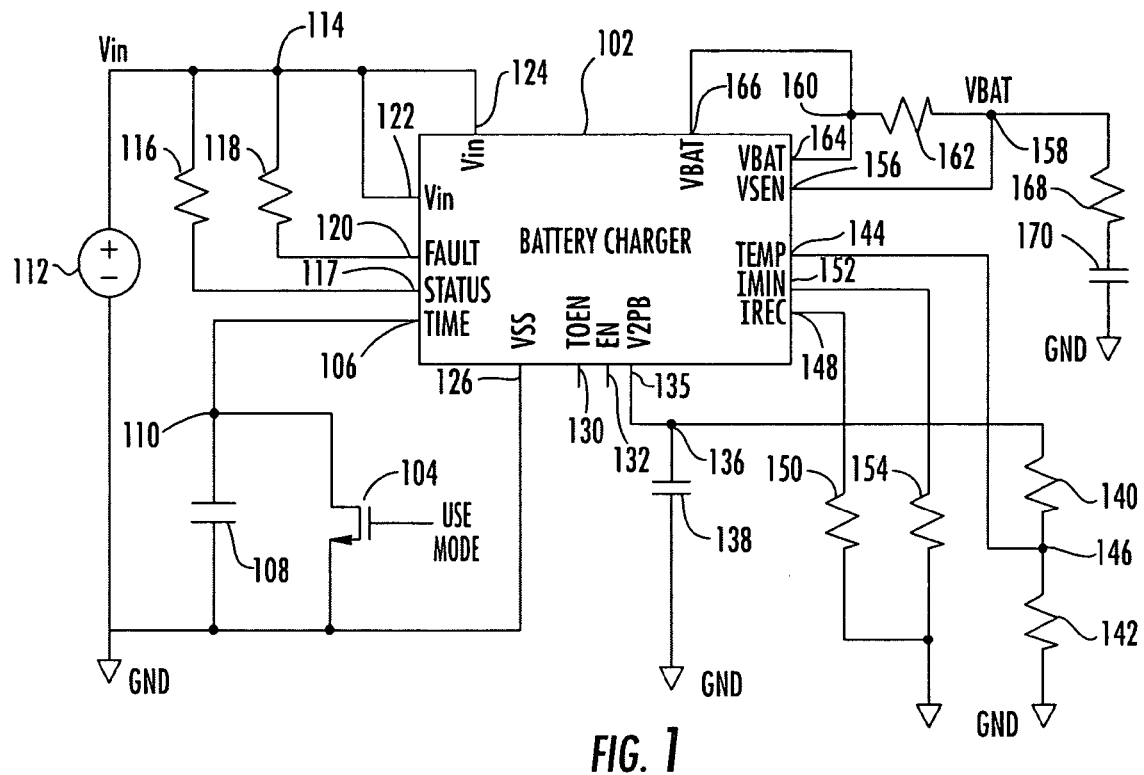
FIG. 1 is a schematic diagram of a battery charger including circuitry for disabling a charging counter of the battery charger during a use mode.

Referring now to the drawings, and more particularly to FIG. 1, there is illustrated a battery charger 102 configured to charge a battery of an associated portable electronic device. The electronic portable device may comprise a cell phone, PDA, laptop computer, portable email receiver, pager, etc. The battery charger 102 includes charge counter circuitry to determine how long a battery of a connected electronic device has been charging. The charge counter circuitry may be implemented as discrete circuits, in one or more integrated circuits, in software executed on a microprocessor or as a combination of software or hardware. The battery charger 102 may have its internal charge counter circuitry disabled responsive to a use mode input applied to an NMOS transistor 104 connected to the TIME pin 106 of the battery charger 102.

The TIME pin 106 is connected to internal charge counter circuitry within the battery charger 102 that includes an oscillator, internal clock and counter that may be used for counting the period of time that a battery charger 102 is providing a charging current to a connected battery. Connected in parallel between the TIME pin 106 and ground, are a capacitor 108 and the NMOS transistor 104. The capacitor 108 is connected between node 110 and ground and the drain/source path of the NMOS transistor 104 is connected between node 110 and ground. The gate of the NMOS transistor 104 is connected to receive the use mode signal from an attached electronic device. In one embodiment of the present disclosure, the use mode signal comprises a talking mode signal provided from a cellular telephone associated with the battery charger 102. The talking mode signal provides an indication that the cellular telephone is in use, and thus any charging current provided by the battery charger 102 is provided to the operation of the connected cellular telephone rather than to charging the battery of the cellular telephone.

When the use/talking mode signal goes high, the NMOS transistor 104 is turned on, and the TIME pin 106 is shorted directly to ground. This causes no clock signal to be generated from the TIME pin 106 by the charge counter circuitry while the TIME pin 106 is shorted to ground. The TIME pin 106 provides sourcing and sinking current to charge and discharge the external capacitor 108 to generate saw-tooth waveform when not shorted. When a user completes using/talking on the associated cellular telephone/electronic device, the talking/use mode is completed and the talking/use mode signal goes low. When this occurs, the NMOS transistor 104 is turned off, and the TIME pin 106 is no longer shorted to ground. This enables the charge counter circuitry within the battery charger 102 to continue to count the time period the associated battery is being charged. Thus, by shorting the TIME pin 106 to ground using the transistor 104 responsive to a talking/use mode signal from an associated electronic device, a counter within the battery charger 102 will only count the time that an associated battery is actually being charged.

Figure 2:
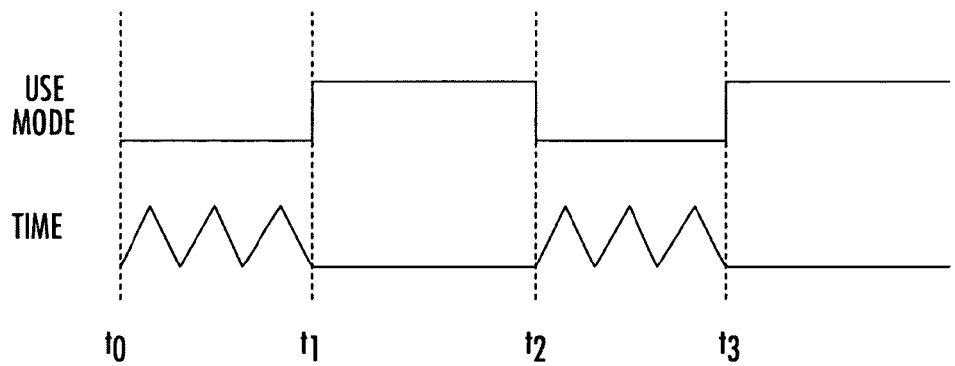
FIG. 2 is a timing diagram illustrating the operation of a counter within the battery charger responsive to a use mode signal of an associated electronic device.

Referring now to FIG. 2, the correspondence between the use mode signal provided from an associated electronic device and a clock signal provided from the TIME pin 106 are illustrated. As can be seen between time $t_0$ and time $t_1$, the use mode signal is low indicating that a user is not using the associated electronic device, and the charge current is actually charging the battery. In this case, the clock signal from the TIME pin 106 between time $t_0$ and $t_1$ is active. At time $t_1$, the use mode signal goes high indicating that a user is using the associated electronic device, and the charge current is no longer charging the associated battery. When this occurs between time $t_1$ and time $t_2$, the TIME pin 106 is connected to ground, and the clock signal provided from the TIME pin 106 is discontinued. When the use mode signal returns to low at time $t_2$, indicating that the user is no longer using the associated electronic device, the clock signal is again provided at the TIME pin 106. This process continues until time $t_3$ when the use mode signal goes high again, turning off the clock signal at TIME pin 106.

Referring now back to FIG. 1, the remainder of the pins of the battery charger 102 are connected to provide the various functionalities appropriate to the battery charger 102. A voltage source 112 is connected between the voltage in node 114 and ground. A resistor 116 is connected between node 114 and the STATUS pin 117 of the battery charger 102. The STATUS pin 117 will remain low during the time period that a battery connected to the battery charger 102 is charging. Once the battery has been completely charged, the STATUS pin 117 goes high to provide an indication of this to the user. A resistor 118 is connected between node 114 and the FAULT pin 120 of the battery charger 102. The FAULT pin 120 provides an indication of various fault occurrences within the battery charger 102. For example, if a connected battery to the battery charger 102 has been charging for a predetermined period of time and the battery has not yet been completely charged, an indication of this may be provided via the FAULT pin 120. The input voltage is provided to the battery charger 102 via VIN pins 122 and 124. The battery charger 102 is connected to ground via pin VSS.

TOEN pin 130 is the time out enable pin used to completely disable the charge counter circuitry. Previous to the solution described by the disclosure herein, this is the manner in which the problem of the charging counter counting not directly counting the time associated with charging of the battery was solved. The counter was disabled using the TOEN pin 130. However, as described herein above, this solution prevented use of the charging counter rather than providing a means for more accurately counting the charging time. The ENABLE pin 132 provides the ability to enable and disable the battery charger. The V2P8 pin 134 provides a DC voltage from the battery charger 102 and is connected to a first node 136. A capacitor 138 resides between node 136 and ground. Additionally, a series combination of resistors 140 and 142 are connected between node 136 and ground. The TEMP pin 144 of the battery charger 102 is connected to a node 146 between resistors 140 and 142. The TEMP pin 144 is used for measuring the temperature of the battery connected to the battery charger 102. The IREF pin 148 is connected through resistor 150 to ground. The IREF pin 148 enables the programming of the charge current for a battery connected to the battery charger 102. The IMIN pin 152 is connected to ground through a resistor 154. The IMIN pin 152 enables the programming of the minimum current that indicates that a connected battery to the battery charger 102 has been completely charged. The VSEN pin 156 is connected to a node 158 to which the battery is connected for charging. Node 158 is connected to node 160 through a resistor 162. VBAT pins 166 and 164 are connected to node 160. Node 158 is also connected through a resistor 168 and a capacitor 170 to ground.

Figure 3:
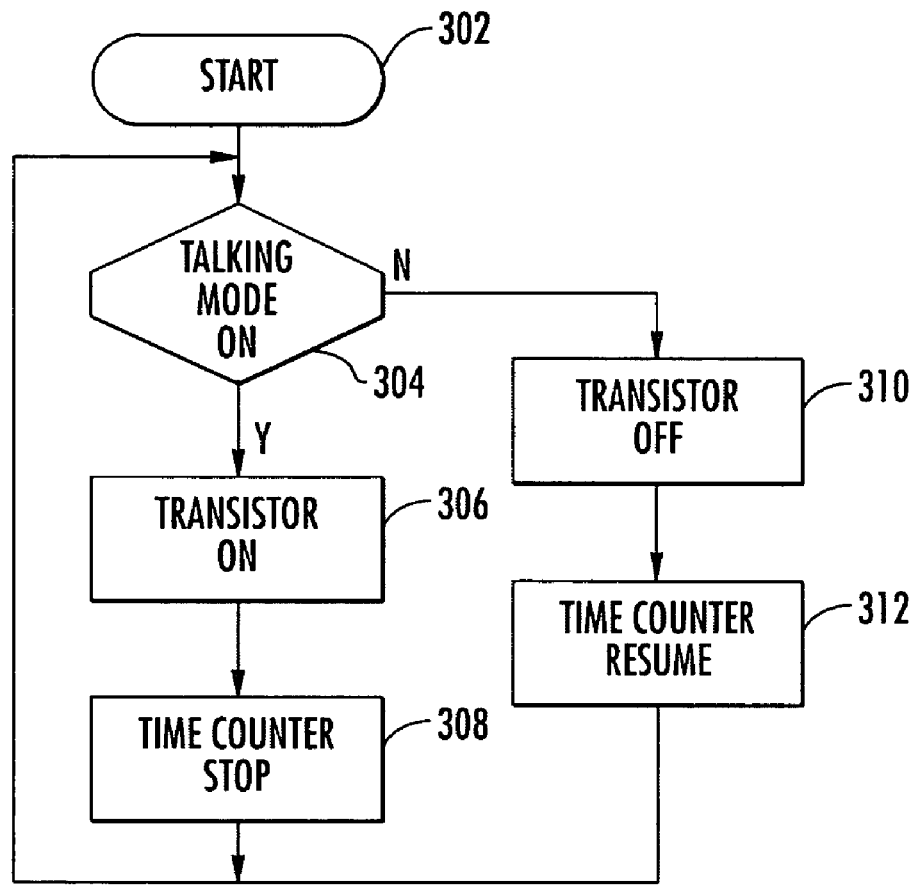
FIG. 3 is a flow diagram describing the operation a battery charger responsive to a talking mode signal from a cellular telephone.

One use of the above described circuit is with a cellular telephone battery charger 102. Referring now also to FIG. 3, there is illustrated a flow diagram describing the operation of the battery charger and associated circuit of FIG. 1 for a charger connected to a cellular telephone. The process begins at step 302. An initial determination is made at inquiry step 304 to determine whether the talking mode is on from the connected cellular telephone. If the talking mode is on, the transistor is turned on at step 306, and the counter measuring the charging time within the battery charger 102 is turned off at step 308. Control passes back to inquiry step 304 to determine if the talking mode is still on or off. If inquiry step 304 determines that the talking mode is off, the transistor is turned off at step 310 and the timer counter within the battery charger measuring the charging time resumes operation at step 312.

Figure 4:
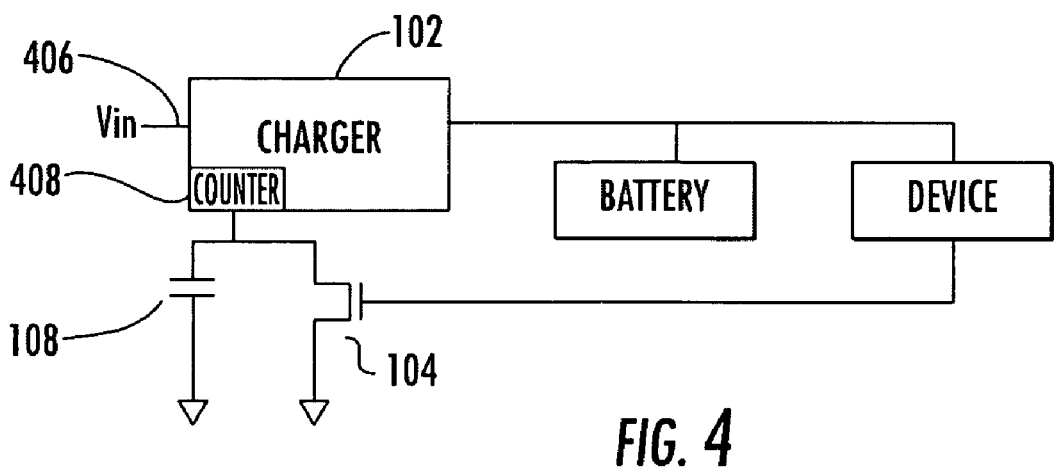
FIG. 4 is a block diagram illustrating a battery charger connected to a device with associated battery that may have its charge counter enabled and disabled.

Referring now to FIG. 4, there is illustrated a configuration according to the present disclosure wherein a charger 102 is connected to a first electronic device 402, having an associated battery 404. The charger 102 is connected to some sort of DC voltage input source 406. A counter circuit 408 located within the battery charger 102 is connected to the NMOS transistor 104 and capacitor 108 as described in FIG. 1. The NMOS transistor may alternatively be any type of transistor capable of operating in the described manner. The gate of transistor 104 is connected to the device 402 to receive the use mode signal which will turn on and off the transistor 104 and enable and disable the counter 408 within the battery charger 102.

Figure 5:
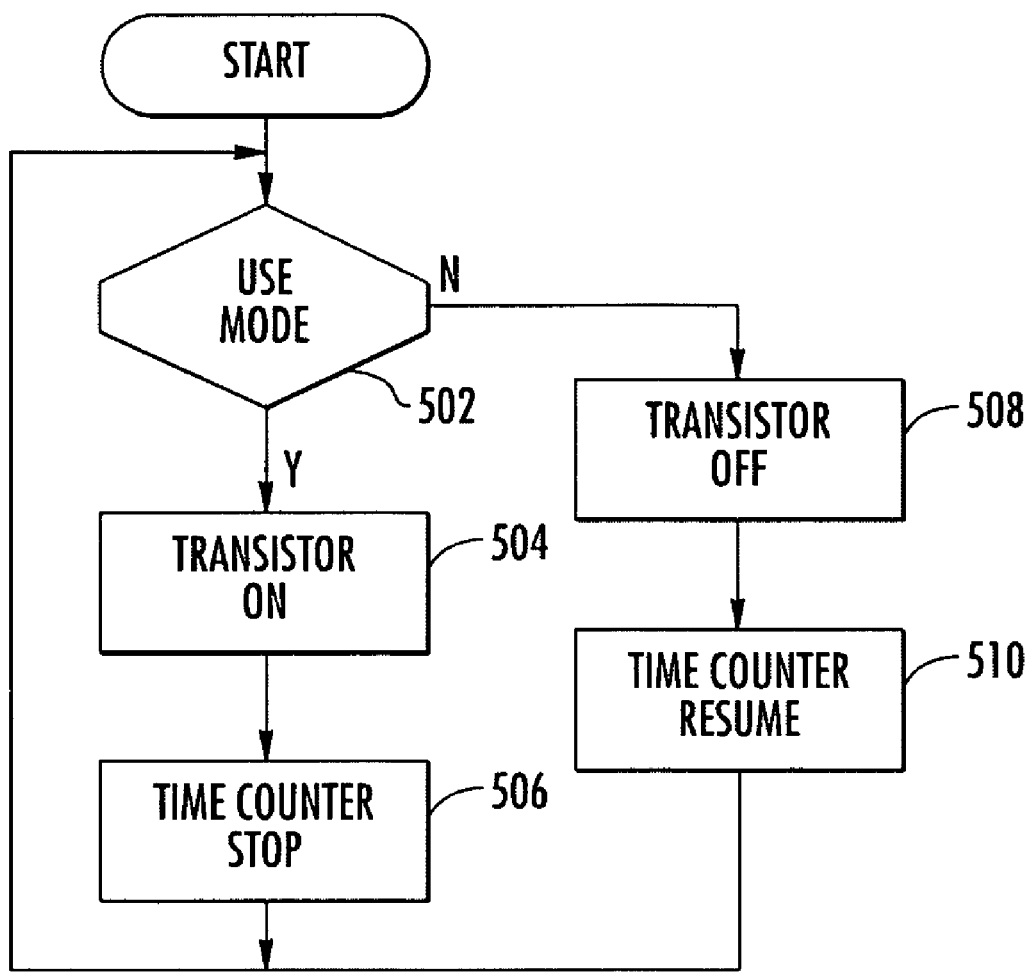
FIG. 5 is a flow diagram illustrating the operation of the circuit of FIG. 4 responsive to a use mode signal from the device.

Referring now to FIG. 5, there is illustrated the operation of the circuit in FIG. 4. Inquiry step 502 monitors for the receipt of a use mode signal from device 402 at the gate of NMOS transistor 104. When the use mode signal is detected, the transistor 104 is turned on at step 504 and the counter circuit stops operation at step 506. Control returns to inquiry step 502. When inquiry step 502 detects a non-use mode signal from the device 402 at the gate of transistor 104, the transistor is turned off at step 508 and the timer counter starts or resumes at step 510.

Using the above described circuitry and method, a charging time for a battery connected to a battery charger may be more accurately tracked by a charging counter within the battery charger, and the possibility of a false fault signal being generated because of failure of the battery to charge within a predetermined time period is minimized.

Although the preferred embodiment has been described in detail, it should be understood that various changes, substitutions and alterations can be made therein without departing from the spirit and scope of the invention as defined by the appended claims.

What is claimed is:

1. An apparatus for disabling charging counter circuitry measuring a total charging time of a battery within a battery charger, comprising:

circuitry connected to a pin associated with the charging counter circuitry measuring a total charging time of a battery within the battery charger, said circuitry and receiving a signal from a device connected to and being charged by the battery charger, said circuitry stopping generation of a clock signal by the charging counter circuitry responsive to the signal at a first level wherein the signal at the first level indicates the device being charged by the battery charger is being used while the device remains connected to the batter charger and continuing generation of the clock signal by the charging counter circuitry responsive to the signal at a second level wherein the signal at the second level indicates the device being charged by the battery charger is not being used while the device remains connected to the battery charger.

2. The apparatus of claim 1, wherein the circuitry stops generation of the clock signal by the charging counter by connecting the pin of the battery charger to ground.

3. The apparatus of claim 1, wherein the circuitry continues generation of the clock signal by the charging counter by disconnecting the pin of the battery charger from ground.

4. The apparatus of claim 1, wherein the circuitry further comprises:
an NMOS transistor having a drain connected to the pin of the battery charger, having a source connected to ground and having a gate connected to receive the signal from the device being charged by the battery charger.

5. An apparatus for selectively disabling a charging counter circuitry measuring a total charging time of a battery within a battery charger, comprising:
a transistor having a drain connected to a pin associated with the charging counter circuitry measuring a total charging time of a battery within of the battery charger, having a source connected to ground and having a gate connected to receive a signal from a device being charged by the battery charger, said transistor stopping generation of a clock signal by the charging counter circuitry by connecting the pin of the battery charger to the ground responsive to the signal at a first level wherein the signal at the first level indicates the device being charged by the battery charger is being used while the device remains connected to the batter charger and continuing generation of the clock signal by the charging counter circuitry by disconnecting the pin of the battery charger from ground responsive to the signal at a second level wherein the signal at the second level indicates the device being charged by the battery charger is not being used while the device remains connected to the battery charger.

6. The apparatus of claim 5, wherein the transistor is an NMOS transistor.

7. A battery charger, comprising:
an input for receiving an input voltage;
first circuitry for providing a charge to a battery of a device connected to the battery charger;
second circuitry for counting a period of time the battery charger has been charging the battery of the device connected to the battery charger having a pin associated therewith; and
third circuitry connected to the pin of the second circuitry and receiving a signal from the device having a battery being charged by the battery charger, said third circuitry for stopping counting by the second circuitry of the period of time the battery charger has been charging the battery of the device responsive to the signal at a first level wherein the signal at the first level indicates the device having its battery charged is being used while the device remains connected to the batter charger and for continuing counting by the second circuitry of the period of time the battery charger has been charging the battery of the device responsive to the signal at a second level wherein the signal at the second level indicates the device having its battery charged is not being used while the device remains connected to the battery charger.

8. The battery charger of claim 7, wherein the third circuitry disables the second circuitry by connecting the pin of the second circuitry to ground.

9. The battery charger of claim 7, wherein the third circuitry enables the second circuitry by disconnecting the pin of the second circuitry from ground.

10. The battery charger of claim 7, wherein the third circuitry further comprise a transistor having a drain connected to the pin of the battery charger, having a source connected to ground and having a gate connected to receive the signal from the device having its battery charged.

11. The apparatus of claim 10, wherein the transistor is an NMOS transistor.

12. A system, comprising:
a battery charger;
a device connected to the battery charger and generating a signal indicating whether the device is being used;
first circuitry within the battery charger for counting a period of time a battery associated with the device has been charging and having a pin associated therewith; and
second circuitry connected to the pin of the first circuitry and receiving a signal from the device having a battery being charged by the battery charger, said second circuitry for stopping counting by the first circuitry of the period of time the battery charger has been charging the battery of the device responsive to the signal at a first level wherein the signal at the first level indicates the device having its battery charged is being used while the device remains connected to the batter charger and for continuing counting by the first circuitry of the period of time the battery charger has been charging the battery of the device responsive to the signal at a second level wherein the signal at the second level indicates the device having its battery charged is not being used while the device remains connected to the batter charger.

13. The system of claim 12, wherein the second circuitry disables the first circuitry by connecting the pin of the first circuitry to ground.

14. The system of claim 12, wherein the second circuitry enables the first circuitry by disconnecting the pin of the first circuitry from ground.

15. The system of claim 12, wherein the second circuitry further comprises a transistor having a drain connected to the pin of the battery charger, having a source connected to ground and having a gate connected to receive the signal from the device having its battery charged.

16. The system of claim 15, wherein the transistor is an NMOS transistor.

17. A method for counting a charging time of a battery associated with a battery charger, comprising the steps of:
receiving a use mode signal at a first level indicating a device having its battery charged connected to the battery charger is in use while the device remains connected to the battery charger;

disabling circuitry counting a charging time of the battery responsive to the use mode signal at the first level;
receiving the use mode signal at a second level indicating a device having its battery charged connected to the battery charger is not in use while the device remains connected to the battery charger; and
enabling the circuitry counting the charging time of the battery responsive to the use mode signal at the second level.

18. The method of claim 17, wherein the step of disabling further comprises the step of connecting the circuitry counting the charging time of the battery to ground.

19. The method of claim 17, wherein the step of enabling further comprises the step of disconnecting the circuitry counting the charging time of the battery from ground.

* * * * *